June 8, 1954  A. C. RADTKE  2,680,272
TAPE AND INCLUDING SEALING MEANS FOR OVERLAPPED PORTIONS
Filed Aug. 29, 1952
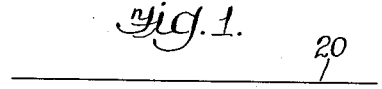
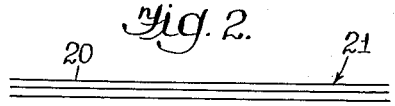
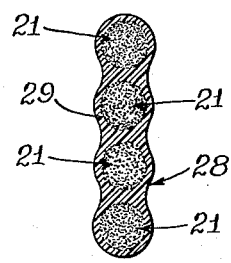
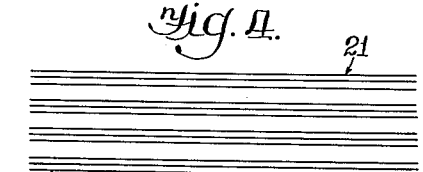
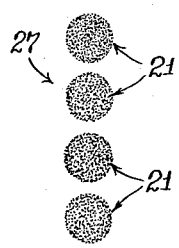
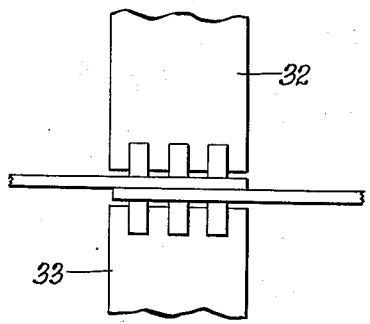
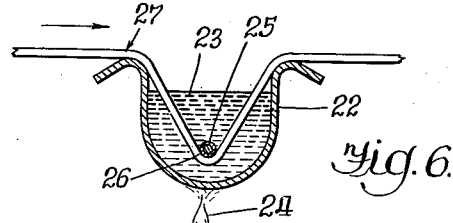
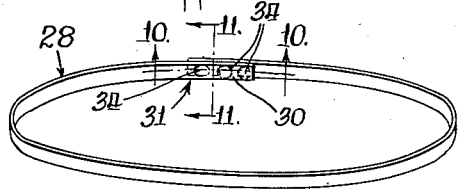
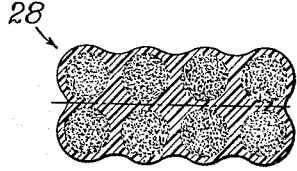
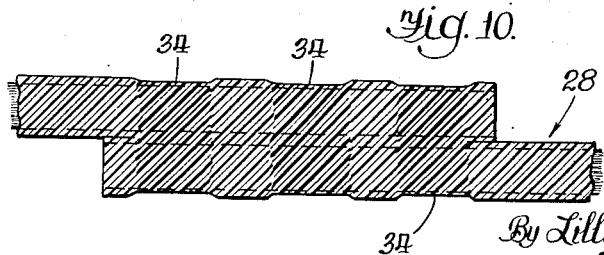
Inventor.
Adelbert C. Radtke, Deceased
By Lillian E. Radtke, Administratrix
By Paul O. Pippel
Atty.

Patented June 8, 1954

2,680,272

UNITED STATES PATENT OFFICE 2,680,272

TAPE AND INCLUDING SEALING MEANS FOR OVERLAPPED PORTIONS

Adelbert C. Radtke, deceased, late of Oak Park, Ill., by Lillian E. Radtke, administratrix, Oak Park, Ill., assignor to International Harvester Company, a corporation of New Jersey Application August 29, 1952, Serial No. 307,086

4 Claims. (Cl. 24—16)

This invention relates to a new and improved tape and including sealing means for overlapped portions, and is a continuation-in-part of Adelbert C. Radtke's copending application entitled "Plastic Twine Bale Tier" having Serial Number 39,672 and filed July 20, 1948.

The present invention is directed to a tape of flat or round cross section and more particularly a construction for a tape suitable for application to and around bales of compressed material. Mechanical hay balers for example are adapted to compress a quantity of hay or other material into any desired shape and while the material is under compression a tie strand such as twine or wire is passed around the bale and a tie or twist put in the ends of the strand. There have been attempts to replace twine and/or wire with other substitute materials in an effort to obtain uniform tie strands for the bales. Glass filaments have a high tensile strength and seemingly would be ideal for use as a substitute twine. However, these glass filaments which are so strong when subjected to longitudinal pull are relatively weak and shatter quite easily when a knot is made with the necessary group of filaments and/or when the several glass filaments abrade each other.

It is, therefore, a principal object of this invention to provide a strand material adequate for use as a bale encircling member and having incorporated therein a number of high tensile strength glass filaments with sufficient coating means to protect the glass filaments from undue abrasion between and with each other.

An important object of this invention is the provision of means in a strand construction wherein the strand comprises a plurality of glass filaments arranged in parallelism and side by side relationship forming a flat tape over which is applied a plastic covering.

Another important object of this invention is to supply a high tensile tape made of continuous glass fiber load-carrying filaments arranged in parallel side by side relationship and the glass fiber filaments bonded together in a unitary tape formation by a plastic covering material.

A further important object of this invention is to provide tape composed principally of load-carrying glass filaments and having a generally thermoplastic covering integrated with and around the filaments to perform the dual function of bonding the glass filaments into relatively fixed relationship free of undesired abrading caused by relative movement of the closely positioned glass filaments, and providing a surface for the tape suitable for the weld attachment of overlapped portions thereof.

Still another important object of this invention is the provision of means in the construction of a tie strand being relatively flat in cross section and composed of a plurality of groups of glass filaments associated in parallel and in side by side relationship and coated with a bonding plastic material.

Another and further important object of this invention is to supply a tie strand comprising a core of a plurality of high tensile strength glass filaments requiring a relatively high temperature to reduce its viscosity, and having a relatively low melting point plastic coating thereon for the purpose of bonding the individual glass filaments together as a unit and for effecting a sealing of the ends of the strand by an overlapping thereof by the application of heat and/or pressure sufficient to soften or melt the plastic only and avoiding interference with the high tensile strength glass filaments which can thus contain the outward pressures of the bale.

Still another important object of this invention is to provide a tie strand composed of glass filaments and a plastic coating and wherein the glass filaments have a softening temperature of something in excess of 2000° F. and the plastic which is primarily a thermoplastic material is fusible under 500° F.

Other and further important objects of this invention will become apparent from the disclosures in the following specification and accompanying drawing.

Strands of material have been made in many different forms. Tie strands have been made of vegetable, animal and synthetic fibres and the most common of these, of course, are the cotton hemp and sisal twines. Vegetable fibres are relatively short in length and as a result they were required to be intertwisted in order to make a long length finished strand. Further, vegetable fibres are relatively soft and the intertwisting of the numerous fibres does not materially effect the tensile strength of the completed strand.

Various synthetic fibres have been produced which are continuous in length. Many of these manufactured fibres have characteristics quite similar to the short natural fibres. Twisting of these continuous length fibres to make thread and yarn creates a product similar to that of the short natural staple fibre strand. Glass filaments, however, present a new problem in view of the fact that the filaments are hard and brittle and have a relatively high temperature softening point, in the order of 1500° F. to 2500° F., as opposed to soft natural fibres and synthetic fibres which soften or melt at relatively low temperatures. Twisting of the glass fibres to form a long strand results in abrading and fracturing of many of the glass filaments due to the friction and the cutting action therebetween. The tensile strength of a twisted glass filament strand thereby is progressively weakened as additive stresses are applied. It has been pointed out in the objects above that this invention is directed to the parallel positioning of glass fibre filaments to increase the tensile strength of the strand, tape or fabric.

Glass filaments as presently made have very minute diameters. A single glass filament is almost invisible, yet as it is manufactured it can be maintained in constant diameter and in a continuous length. The handling of a single filament so fine is extremely difficult and ordinarily requires the grouping of numerous filaments adhesively bonded together by a suitable coating. The strand of this invention dispenses with the twisting of glass fibres and thus materially increases the tensile strength of the resultant strand and simultaneously materially reduces the number of filaments necessary to maintain the desired tensile strength.

In the drawings:

Fig. 1 shows an enlarged elevational view of a glass filament;

Fig. 2 diagrammatically shows a thread composed of a plurality of glass filaments as shown in Fig. 1 and arranged in parallelism;

Fig. 3 is an end view of the thread of Fig. 2;

Fig. 4 shows several threads such as shown in Fig. 2 in parallel flat relationship;

Fig. 5 is an end view of the device of Fig. 4;

Fig. 6 shows a sectional view of the plastic dipping step of the strands drawn to a smaller scale;

Fig. 7 shows an enlarged end view similar to Fig. 5 with the plastic coating thereon;

Fig. 8 shows a perspective view of a looped strand of the tape drawn to a scale smaller than that shown in Fig. 7 with the ends thereof overlapped;

Fig. 9 shows a side elevational view of the tape overlap and the bonding means to effect welding of the plastic coating;

Fig. 10 shows an enlarged longitudinal sectional view of the welded or fused tape taken on the line 10—10 of Fig. 8; and Fig. 11 is a cross sectional view of the welded overlap joint as taken on the line 11—11 of Fig. 8.

As shown by way of example in the drawings, the reference numeral 20 indicates generally a very fine load carrying glass filament. Glass has a softening point in the order of 1500° F. to 2500° F. and thus the glass filaments here used are quite stable and resistant to breaking down upon the application of heat thereto. A plurality of these filaments are laid parallel to each other such as shown in Fig. 2 and form a thread or group 21. The very minute glass filaments, as previously stated, are very difficult to handle and especially in an untwisted form, hence in order to make the grouped filaments 21 somewhat stable for handling a suitable coating is applied to the surface of the filaments. This coating functions to hold the glass strands in condition for handling. A filament coating compatible with the plastic bonding material to be used as the outer strand covering is desirable.

Fig. 3 shows that the thread 21 has its component glass filaments laid parallel one to another and arranged in a circular shape.

Fig. 4 shows the laying of several of the threads or groups 21 parallel to each other in a flat plane as indicated by Fig. 5. These groups of glass filaments constitute the major cross-sectional area of the completed strand.

A vat 22 holds the generally thermoplastic material 23 in a fluid state. The fluid plastic may be a cold solution, emulsion, or hot melt. In the latter case, in order to maintain the plastic fluid a source of heat 24 must necessarily be applied to the vat or container. The interior of the container 22 is equipped with a roller 25 having pins 26 journaled in the interior of the container walls in such a manner that the roller 25 may freely rotate well beneath the upper surface of the plastic container within the vat 22. The plastic is generally entirely thermoplastic and contains principally thermoplastic materials but is not limited to other additive materials which will not impair the material from being softenable by the application of heat. Some thermoplastic materials found acceptable as an outer coating over the glass base are Polystyrene Plastics and Vinyl Resins, Methyl Methacrylate Plastics, Nylon Plastics, and Cellulose Derivative Plastics. However, thermoplastic materials are constantly being developed and it is not intended by the above list to be limiting in any respect other than broadly the coating should be generally thermoplastic. The amount of heat necessary to effect melting or fusing of thermoplastics is usually under 500° F. or in the order of 350° F. which is considerably less than the 1500° F. to 2500° F. necessary to soften the inner glass core. Although presently known thermoplastic plastics soften sufficiently to fuse at 500° F. or under it is not the intention to eliminate those thermoplastics which maybe later discovered and which melt at temperatures above 500° F. In order to fulfill the terms of this invention it is necessary only that there exist a substantial temperature differential between the softening temperature of the thermoplastic plastic covering and the softening temperature of the glass core as will later be described. The parallel threads arranged in the manner shown in Figs. 4 and 5 designated by the numeral 27 are held in flat parallel relationship and fed into the vat through the fluid plastic 23, beneath the roller 25, and up and out the other side of the vat. The fluid plastic immediately congeals about the groups of glass filaments 21 resulting in a flat tape or ribbon 28 as shown in Fig. 7. The proximate groups remain substantially separated one from the other and an end or cross-sectional view of the strand as in Figs. 7 and 11 show that the individual groups of filaments 21 retain their identity as to shape. The outer surface of the tape 28 is the thermoplastic coating designated by the numeral 29 and it bonds the filaments 21 to each other. The thermoplastic coating is relatively thin and constitutes only a minor portion of the cross-sectional area of the completed ribbon strand.

The resultant tape 28 may be tied in the manner employed for twines of other materials, yet this would partially negative the numerous advantages gained in maintaining the glass strands all substantially parallel to each other. Thus it is proposed that the tape or ribbon strand 28 be attached by overlapping the ends 30 and 31 in the manner indicated in Fig. 8. Heat and pressure could then be applied to both sides of the overlap by means of suitable heat controlled pressure fusing plates or the like 32 and 33. These fusing plates may have polished flat bottoms or be notched in the manner shown so that molecular fusing or welding of the plastic coating takes place at spaced intervals along the length of the overlap. As stated in the objects above the fusing of the plastic coatings does not alter the tensile strength of the entire strand even during the actual fusing of the strand ends. Thus the great differential in temperatures necessary to affect the glass core and the thermoplastic coating is the means for making the present strand sealing effective. This is extremely important in automatically operating baling or binding machines for the reason no other means is necessary to maintain the bales or bundles under compression during fusing of the ends of the encircling strand. The fused portions of the overlap are indicated by the numeral 34. The plastic coatings at the area of fusion thus maintain all the glass filaments parallel to each other and there is therefore no cutting action between the filaments. The molecularly joined or welded joint of a predetermined strand overlap is capable of a tensile strength equal to or greater than that of the body of the ribbon 28 itself and thus a new strand and a method of attaching are formed.

An example of where the tape strand and "tie" may be used is in bale making. This would be true whether the bales were of hay, straw, cotton, excelsior, paper, or any baleable material. In bales of all types a high tensile strand must be employed and suitable attaching means for the ends of the encircling strand must be provided. By actual test twisted glass fibres bonded by plastic into a strand or tape showed breaking strength of the strand to be much lower than when comprised of the same number of parallel bonded glass fibres. An inherent weakness of any glass fibre twisted strand is in its knot strength. The use of a plastic coating prevents individual fibres from frictionally abrading one another, thereby greatly increasing the knot strength as well as the tensile strength of the strand. The final tie strand tape as described above, in which the glass filaments are disposed in parallel relationship and the attaching of overlapped ends is accomplished by a heating and fusing has a very high tensile strength and easily contains the great outward forces of the compressed bale both during and subsequent to the fusing of the encircled strand ends.

Obviously many details of construction may be varied from the examples heretofore described without departing from the principles disclosed herein and it is therefore not proposed to limit the patent granted hereon otherwise than as necessitated by the appended claims.

What is claimed is:

1. As an article of manufacture a tie strand composed of a group of minute high tensile strength glass filaments laid in parallelism side by side and untwisted, said glass filaments capable of softening within the range of 1500° F. to 2500° F. and the article further characterized by the provision of a series of said groups positioned in side-by-side relation in parallelism and covered by a relatively thin thermoplastic coating completely covering such groups of filaments so that proximate groups of filaments are separated one from the other and the major cross-sectional area of the completed tie strand is composed of glass filaments, and said thermoplastic coating is capable of fusing under 500° F.

2. A tie strand as set forth in claim 1 in which the series of said groups are disposed in a flat plane and the end portions of said strand are overlapped, and said overlapped portions of the strand have their adjacent plastic coatings molecularly united by the application of pressure and heat sufficient to fuse the plastic coating under 500° F. without affecting the high tensile strength of the inner glass filaments.

3. A bale tie strand as set forth in claim 2 in which the molecular union of the strand end portions comprises longitudinally spaced apart unions of the plastic coating over the length of overlap of the strand end portions.

4. A tie strand composed of a plurality of longitudinally extending minute diameter load-carrying glass filaments disposed in a parallel relationship with each other, said minute diameter glass filaments encased in a thermoplastic coating, said load-carrying glass filaments having a softening temperature of the order of 1500° F. to 2500° F. which is considerably higher than the fusing temperature of the thermoplastic coating of the order of 500° F. and under, whereby two ends of the tie strand may be spliced under tensile load in an overlapping joint by the application of heat and pressure to cause fusion of the adjoining thermoplastic coatings without affecting the tensile strength of the load-carrying glass filaments.

References Cited in the file of this patent

UNITED STATES PATENTS

| Number | Name | Date |
|---|---|---|
| 2,135,057 | Slayter et al. | Nov. 1, 1938 |
| 2,283,202 | Guyard | May 19, 1942 |
| 2,293,246 | Fay | Aug. 18, 1942 |
| 2,356,059 | Humphner | Aug. 15, 1944 |
| 2,500,523 | Crosby et al. | Mar. 14, 1950 |
| 2,526,324 | Bloomfield | Oct. 17, 1950 |
| 2,571,372 | Martin | Oct. 16, 1951 |